(No Model.)  4 Sheets—Sheet 1.
J. B. MOODY.
ILLUSTRATED NUMBER CARDS.
No. 367,223.  Patented July 26, 1887.
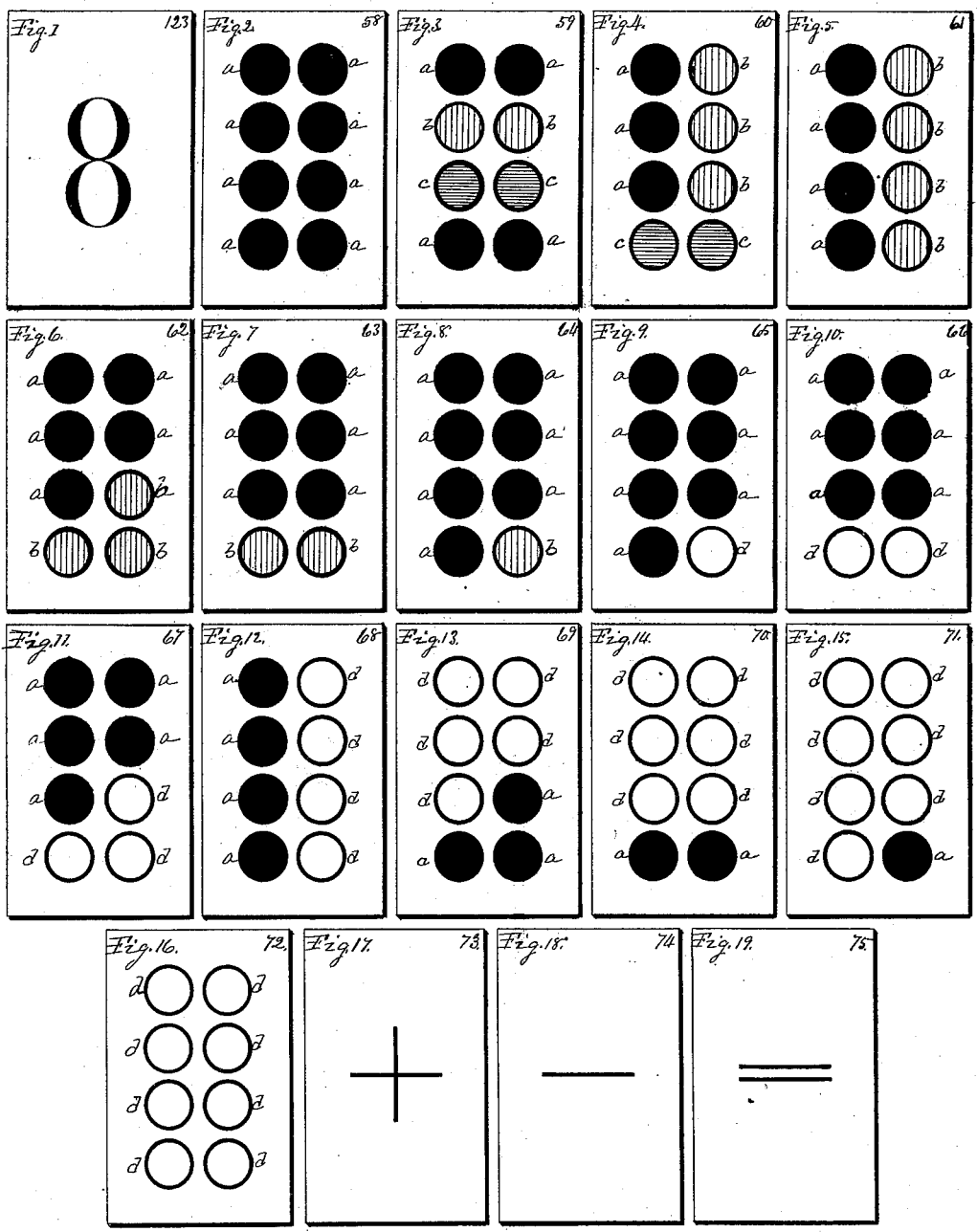
Witnesses.
A. O. Behel
Chas Shuman
Inventor.
Jepic B. Moody
Per Jacob Behel
Atty.

(No Model.)　　　　　　　　　　　　　　　　　　4 Sheets—Sheet 2.
J. B. MOODY.
ILLUSTRATED NUMBER CARDS.

No. 367,223.　　　　　　　　　　Patented July 26, 1887.

| Fig. 20. (123) | Fig. 21. (58) | Fig. 22. (59) | Fig. 23. (60) | Fig. 24. (61) |
|---|---|---|---|---|
| 8 | 8 + 0 =<br>0 + 8 =<br>8 − 0 = | 2+2+2+2 = | 3+3+2 =<br>2+3+3 = | 4 + 4 = |

| Fig. 25. (62) | Fig. 26. (63) | Fig. 27. (64) | Fig. 28. (65) | Fig. 29. (66) |
|---|---|---|---|---|
| 5 + 3 =<br>3 − 5 = | 6 + 2 =<br>2 − 6 = | 7 + 1 =<br>1 − 7 = | 8 − 1 = | 8 − 2 = |

| Fig. 30. (67) | Fig. 31. (68) | Fig. 32. (69) | Fig. 33. (70) | Fig. 34. (71) |
|---|---|---|---|---|
| 8 − 3 = | 8 − 4 = | 8 − 5 = | 8 − 6 = | 8 − 7 = |

| Fig. 35. (72) | Fig. 36. (73) | Fig. 37. (74) | Fig. 38. (75) |
|---|---|---|---|
| 8 − 8 = | + | − | = |

Witnesses.　　　　　　　　　　　　　　　Inventor.
A. O. Behel　　　　　　　　　　　　　　Jesse B. Moody,
Chas Shuman　　　　　　　　　　　Per Jacob Behel
　　　　　　　　　　　　　　　　　　　Atty.

(No Model.) 4 Sheets—Sheet 3.
J. B. MOODY.
ILLUSTRATED NUMBER CARDS.
No. 367,223. Patented July 26, 1887.
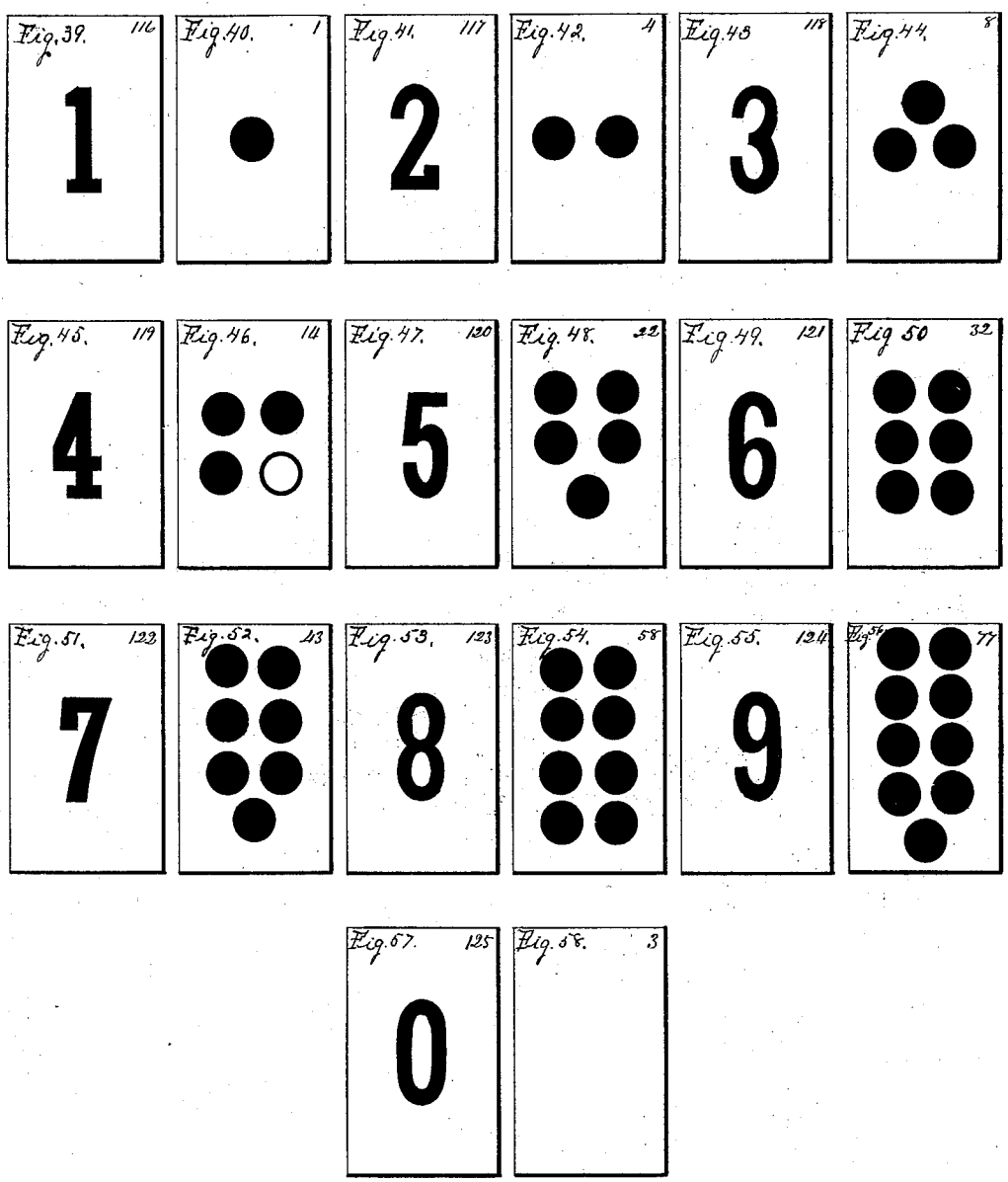
Witnesses.
Evans Blake
A. D. Behel
Inventor
Jesse B. Moody
Per Jacob Behel
Atty.

(No Model.)   J. B. MOODY.   4 Sheets—Sheet 4.
ILLUSTRATED NUMBER CARDS.
No. 367,223.                  Patented July 26, 1887.
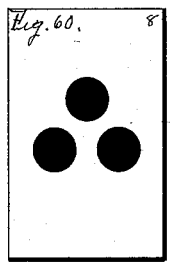 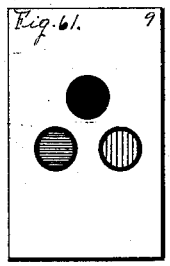 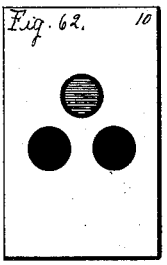 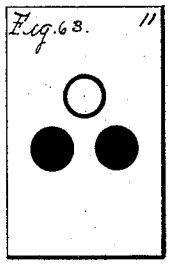 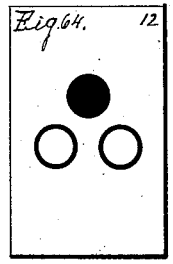 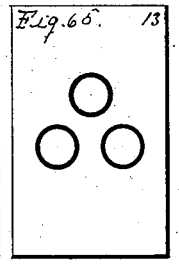
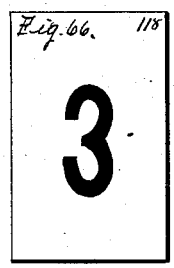
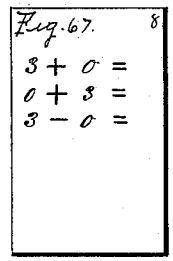 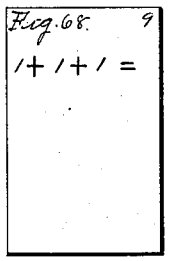 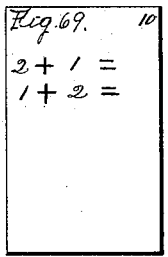 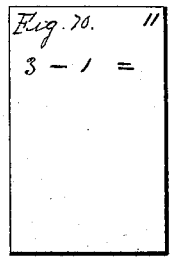 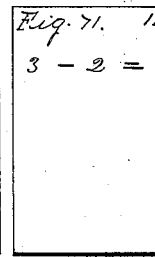 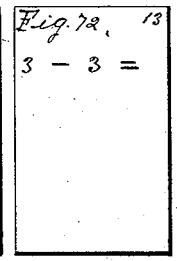
Witnesses.
Evans Blake
A. O. Behel
Inventor
Jefee B. Moody
Per Jacob Behel
Atty.
N. PETERS, Photo-Lithographer, Washington, D. C.

UNITED STATES PATENT OFFICE.

JESSIE B. MOODY, OF ROCKFORD, ILLINOIS.

ILLUSTRATED NUMBER-CARD.

SPECIFICATION forming part of Letters Patent No. 367,223, dated July 26, 1887.

Application filed February 14, 1887. Serial No. 227,628. (No model.)

*To all whom it may concern:*

Be it known that I, JESSIE B. MOODY, a citizen of the United States, residing in the city of Rockford, in the county of Winnebago and State of Illinois, have invented a new and useful Improvement in Illustrated Numbers, of which the following is a specification.

This invention relates to the art of teaching the elements of numerical computations. Its object is to provide means to enable a teacher to impart to pupils an intelligent understanding of the component elements of the character or of some of the characters employed in numerical computations, such as the Arabic numerals or digits, and arithmetical signs or symbols, and also to impart to them an understanding of the relative and comparative value of the numerals of the signs and symbols employed.

It consists, first, of a blank card containing the card No. 1.

It consists, second, in a series of cards containing illustrated characters, said series composed of a sub-series based upon each Arabic numeral in the series of numerals embraced in the illustrated-card series, and in this instance consists of one hundred cards, numbered consecutively from 2 to 72, inclusive, and from 76 to 114, inclusive.

It consists, third, in a sub-series of three cards, representing the arithmetical signs, plus, minus, and equal, numbered consecutively from 73 to 75, inclusive.

It consists, fourth, in a sub-series of ten cards, representing the Arabic numerals embraced in the series, in this instance from 1 to 10, inclusive, and numbered in their order consecutively from 116 to 125, inclusive.

It consists, fifth, of a card representing the cipher of the Arabic numerals, and its card number is 126.

It consists, sixth, in a sub-series of cards representing the arithmetical signs, multiplication and division, and are numbered 127 and 128, respectively. All of which will be hereinafter more fully described in connection with the accompanying drawings.

To illustrate my improvement, I have selected from the series a sub-series based upon the numeral 8, which I have represented in the accompanying drawings, and for this purpose I have employed Sheets 1 and 2, Figs. 1 to 38, inclusive. I have also represented a sub-series based on the numeral 3. (See Sheet 4, Figs. 59 to 72, inclusive.) The fundamental series is represented on Sheet 3, Figs. 39 to 58, inclusive. Figs. 1 to 38 represent the opposite sides of the cards in the sub-series 8, and also three cards representing some of the signs of operation, and a full explanation of this sub-series will be sufficient to show the principle of the invention.

For the purposes of this specification I have given to each card on both sheets a figure number, which is placed on the upper left-hand corner of the cards represented.

The several cards of the series are each provided with a card number fixed on its upper right-hand corner, and these card numbers are the same on both sides of the same card, as shown in the corresponding cards on both sheets of the drawings, and like card numbers represent the same card and the number of the respective cards of the series.

In Sheet 1 of the drawings the figures represent the face of the cards to be first employed, and Figure 1 represents the numeral 8, on which the cards of the sub-series represented in the drawings, Figs. 1 to 38, inclusive, are based. In Sheet 1 the figure numbers run in their consecutive order from 1 to 19, inclusive, and in Sheet 2 the figure numbers are also in their consecutive order from 20 to 38, inclusive.

An inspection of Sheet 1 of the drawings will reveal the fact that the cards thereon, shown from Fig. 2 to Fig. 16, inclusive, are each provided in two vertical columns with eight characters, four in each vertical column and laterally in twos opposite each other. The characters employed in this instance are preferably of uniform circular outline, and are variously surface-shaded to produce varieties readily distinguishable; but in the manufacture of my improved cards I prefer to employ various colors instead of the surface-shading employed in the drawings; and, as an instance, a red color may be employed instead of the full black surface shown at *a*, a blue instead of the vertical line-surface shading shown at *b*, a yellow instead of the lateral line-surface shading shown at *c*, and the character represented at *d* I prefer of the open form shown; but in every instance I prefer to produce the characters with a wide marginal line in a color showing a marked contrast with the colored surface of the characters substantially as the black marginal lines and open center shown at *d*. It will, however, be sufficient for practical purposes, if desired, to retain the full black characters shown at *a* and the open characters shown at *d*, and to substitute other suitable colors, such as red and yellow, for the vertical and lateral line-shaded surfaces shown at *b* and *c*.

The card Fig. 1 represents the numeral 8, which forms the base of the sub-series shown. Each card from Fig. 2 to Fig. 8, inclusive, is provided with eight like or unlike characters, *a b c*, designed to represent eight units or things of a kind or of different kinds, as in Fig. 2 eight of a kind, *a*, are shown. In Fig. 3 two of the characters *a*, two of the characters *b*, two of the characters *c*, and then again two of the characters *a* are shown, making the full number eight.

In Fig. 4 three of the characters *a*, three of *b*, and two of *c* are shown; in Fig. 5, four of *a* and four of *b*; in Fig. 6, five of *a* and three of *b*; in Fig. 7, six of *a* and two of *b*; and in Fig. 8 seven characters of *a* and one of *b* are shown, making the full number eight in each card.

In the several cards, from Fig. 9 to Fig. 16, inclusive, open characters *d* are employed in connection with the character *a*, and this additional open character *d* is designed to represent the 0 or the cipher of the series of Arabic numerals; and hence it is without value, and is read nothing, or other equivalent terms may be employed in its readings.

In card Fig. 9 are shown seven characters *a* and one *c*; in Fig. 10, six characters *a* and two *c* are shown; in Fig. 11, five *a* and three *c*; in Fig. 12, four *a* and four *c*; in Fig. 13, five *c* and three *a*; in Fig. 14, six *c* and two *a*; in Fig. 15, seven characters *c* and one *a* are shown; and in Fig. 16, eight characters *c* are shown.

The three remaining cards of Sheet 1, from Fig. 17 to Fig. 19, inclusive, represent the arithmetical signs, plus, minus, and equal, in the order of their figure numbers.

The several cards from Fig. 20 to Fig. 38, inclusive, on Sheet 2, represent the back or opposite side of the several cards of corresponding card number shown on Sheet 1.

In presenting to the pupils the sub-series of cards represented on Sheet 1 it is presumed that they have passed through the study of the various sub-series of card-illustrated numbers hereinbefore referred to, based on the several numerals of the series up to and including numeral 7, and that they are familiar with and understand the card illustrations of all the preceding sub-series, and also the base numerals of the several sub-series preceding the sub-series shown in the drawings.

In the first presentation of the sub-series of cards of illustrated numbers shown in Sheet 1 of the drawings I prefer to employ card Fig. 2 first, and then each successive card in the order of its number, up to and including card Fig. 8, accompanied by the necessary instructions on the part of the teacher.

The several cards from Fig. 9 to Fig. 16 are next presented in the order of their numbers, commencing with Fig. 9, and in their presentation are accompanied with the necessary instructions given by the teacher, the object being in the first instance to impress the mind of the pupil that 8 means a combination of eight distinct units or things, and in the second instance to impress the mind of the pupil that 8 is capable of containing a number of units equal to any one of the preceding digits.

The card Fig. 1, representing the numeral 8, is next presented to the pupil as the representative character of the sub-series of cards, from Fig. 2 to Fig. 16, inclusive, and he is questioned thereon as to the subject-matter disclosed in presenting the several cards of the sub-series.

Under the instructions of the teacher the pupil is next made familiar with the arithmetical signs represented on cards from Fig. 17 to Fig. 19, inclusive, and when they are understood by the pupil they are employed in connection with the several cards from Fig. 2 to Fig. 16, inclusive, and their readings are indicated on the rear face view of the respective cards of corresponding card numbers represented on Sheet 2.

In the foregoing I have given the elements or component parts of the numeral 8, on which the sub-series of cards represented in the drawings, Figs. 1 to 38, inclusive, are based. The several combinations presented and their order of presentation, as well as the kind and number of questions to be propounded, are matters for the teacher to determine according to his or her discretion.

The several cards represented in the drawings from Fig. 2 to Fig. 16, inclusive, and the representation of their opposite sides (shown on Sheet 2 from Fig. 21 to Fig. 35, inclusive) constitute but one sub series of the card series of illustrated numbers.

The several sub-series of the card series of illustrated numbers hereinbefore referred to, but not shown in the drawings, consist of a number of like cards to each numeral in the series, and the several sub-series, based upon each numeral of the series, are each provided with like characters of like colors or shaded surfaces to those shown and described as constituting the sub-series based upon the numeral 8, and the number of such characters on each card of each sub-series composed on their respective base numeral are arranged in their several combinations substantially in the same manner as shown in the several figures of the drawings, Figs. 1 to 38, inclusive. For example, the sub-series based upon the numeral 3 would consist of cards having a sum total of three characters on the face, as shown in Figs. 59 to 66.

To complete the card series of illustrated numbers, still another card to represent the character c (shown in the drawings) is employed.

The numeral sub-series, consisting of ten cards, Figs. 39 to 58, inclusive, of which Fig. 1 is a representation, are each provided with one of the numerals of the fundamental series substantially in the same manner as shown, and each such card forms the base of a corresponding sub series of the card series of illustrated numbers. The numeral sub-series also contains a card employed to represent the cipher of the series of numerals. Still another sub-series of cards is contained in the series; and it consists of cards, each one of which represents one of the arithmetical signs or symbols, plus, minus, equal, multiplication, and division, substantially in the manner shown at Figs. 17 to 19, inclusive, and Figs. 36 to 38, inclusive.

It is evident that various combinations, forms, and colors of characters may be employed.

I claim as my invention—

1. The herein-described means for imparting instruction, consisting, essentially, of a fundamental series of cards provided with characters representing the Arabic numerals or digits, and a sub-series of cards based on some one of the Arabic numerals or digits, the cards of the sub-series being provided with characters representing units or groups of units, the said characters having a distinguishing appearance, substantially as and for the purpose set forth.

2. The herein-described means for imparting instruction, consisting, essentially, of a fundamental series of cards representing the Arabic numerals or digits, and a sub-series of cards provided with characters arranged in distinguishable groups, the sum total of characters composing all the groups on each card of the sub-series being the same and corresponding to the number of units represented by some one of the Arabic numerals, substantially as set forth.

3. As a means for imparting instruction, a fundamental series of cards provided with characters representing the Arabic numerals, a sub-series based upon some one of the Arabic numerals, each card in the sub-series being provided with as many characters as the numeral upon which the sub-series is based represents, and an additional series of cards representing the arithmetical signs of operation, substantially as set forth.

4. As a means for imparting instruction, a fundamental series of cards provided with characters representing the Arabic numerals, and a sub-series of cards based upon some one of the Arabic numerals, each card of the sub-series being provided on one face with characters grouped to represent a sum total of things equal to the number of units represented by the base numeral, and on the opposite face with representations of arithmetical operations, substantially as set forth.

5. As a means for imparting instruction, a fundamental series of cards provided with characters representing a series of numerals, and a sub-series of cards, one sub-series to each numeral of the fundamental series, each card of a sub-series being provided with a number of distinguishable characters corresponding to the number of units represented by the numeral upon which its sub series is based, substantially as set forth.

6. In a system of illustrated numbers for imparting instruction, a fundamental series of cards provided with characters representing numerals, and a sub-series of cards provided with a number of characters corresponding to one of the numerals, one or more of the characters on the cards in the sub-series being provided with a broad marginal line distinguishable from the central portion of the character, substantially as set forth.

JESSIE B. MOODY.

Witnesses:
JACOB BEHEL,
A. O. BEHEL.